(12) United States Patent
Dhanuka et al.

(10) Patent No.: US 12,243,132 B2
(45) Date of Patent: Mar. 4, 2025

(54) PARTIAL DEPTH ORDERING WITH VECTOR INTERLACING

(71) Applicant: Adobe Inc., San Jose, CA (US)

(72) Inventors: Praveen Kumar Dhanuka, Kolkata (IN); Harish Kumar, Uttar Pradesh (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 331 days.

(21) Appl. No.: 17/719,847

(22) Filed: Apr. 13, 2022

(65) Prior Publication Data

US 2023/0334737 A1    Oct. 19, 2023

(51) Int. Cl.
- *G06T 11/60* (2006.01)
- *G06T 11/20* (2006.01)
- *G06T 15/04* (2011.01)

(52) U.S. Cl.
CPC ............ *G06T 11/60* (2013.01); *G06T 11/203* (2013.01); *G06T 15/04* (2013.01)

(58) Field of Classification Search
CPC ........ G06T 11/60; G06T 11/203; G06T 15/04
See application file for complete search history.

(56) References Cited

U.S. PATENT DOCUMENTS

| | | | |
|---|---|---|---|
| 7,502,028 B1 | 3/2009 | Asente et al. | |
| 7,633,504 B2 | 12/2009 | Asente et al. | |
| 2011/0285742 A1* | 11/2011 | Kilgard | G06T 11/203 345/589 |
| 2013/0063473 A1* | 3/2013 | Pelton | G06T 11/40 345/592 |
| 2017/0084003 A1* | 3/2017 | Parag | G06F 3/04842 |
| 2022/0215642 A1* | 7/2022 | Batra | G06F 3/0482 |

OTHER PUBLICATIONS

Asente et al., "Dynamic Planar Map Illustration", ACM Transactions on Graphics, vol. 26, No. 3, Article 30, Jul. 2007, pp. 30-31-30-10.
McCann et al., "Local Layering", ACM Transactions on Graphics 28(3), Jul. 2009, 7 pages.

* cited by examiner

*Primary Examiner* — Terrell M Robinson
(74) *Attorney, Agent, or Firm* — Nicholson De Vos Webster & Elliott LLP

(57) ABSTRACT

Embodiments are disclosed for interlacing vector objects. A method of interlacing vector objects may include receiving a selection of a first vector object of an image. The method may further include detecting a second vector object of the image, wherein the second vector object is different than the first vector object. The method may further include determining a first depth position for the first vector object and a second depth position for the second vector object. The method may further include interlacing the second vector object and the first vector object, wherein interlacing comprises drawing the first vector object based on the first depth position and the second vector object based on the second depth position.

20 Claims, 11 Drawing Sheets

PARTIAL DEPTH ORDERING WITH VECTOR INTERLACING

BACKGROUND

In digital image editing, interlacing vector objects adds visual depth to plain vectors. Adding depth to plain vectors is one of the most challenging aspects of vector graphics. Further challenges are presented when an object is below or above another object. For rich vector designs such as one object wrapping around another object, using conventional techniques, it is not possible to keep both objects intact. An object can be entirely below another object or entirely above another object but cannot be interlaced to keep the object partially above or partially below another object. In order for a conventional technique to interlace partially above/below objects, the objects must be broken into smaller pieces. Any overlapping portions of the object above needs to be removed from the object below to interlace the two objects. The bottom object is broken into pieces based on the overlapping portions, which creates multiple smaller objects, some of which are in overlapping portions. During interlacing, the smaller objects in the overlapping portions are removed to accommodate the object above. The smaller objects that are removed during interlacing are unavailable for any subsequent processing and are also unable to be restored to their original geometries.

SUMMARY

Introduced here are techniques/technologies that relate to vector interlacing and preserving original object geometries. A vector interlacing system generates custom drawing commands that accommodate depth positions of various vector objects in an image. The depth positions represent a position of each vector object relative to other vector objects. The vector interlacing system generates drawing commands using the depth position of each vector object such that objects with a lower depth position (e.g., below) are only drawn for pixels where no objects with a higher depth position (e.g., above) are drawn. Depth positions are assigned using a user selection of a top object and a bottom object. A set of drawing commands is generated and communicated to a processor that is coupled to a frame buffer. The processor writes the first vector object and the second vector object to the frame buffer using a stencil texture. The use of the stencil texture provides the processor an ability to preserve the original geometry of the first vector object and the second vector object during interlacing because the first vector object is written only where the second vector object does not have a stencil texture value.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
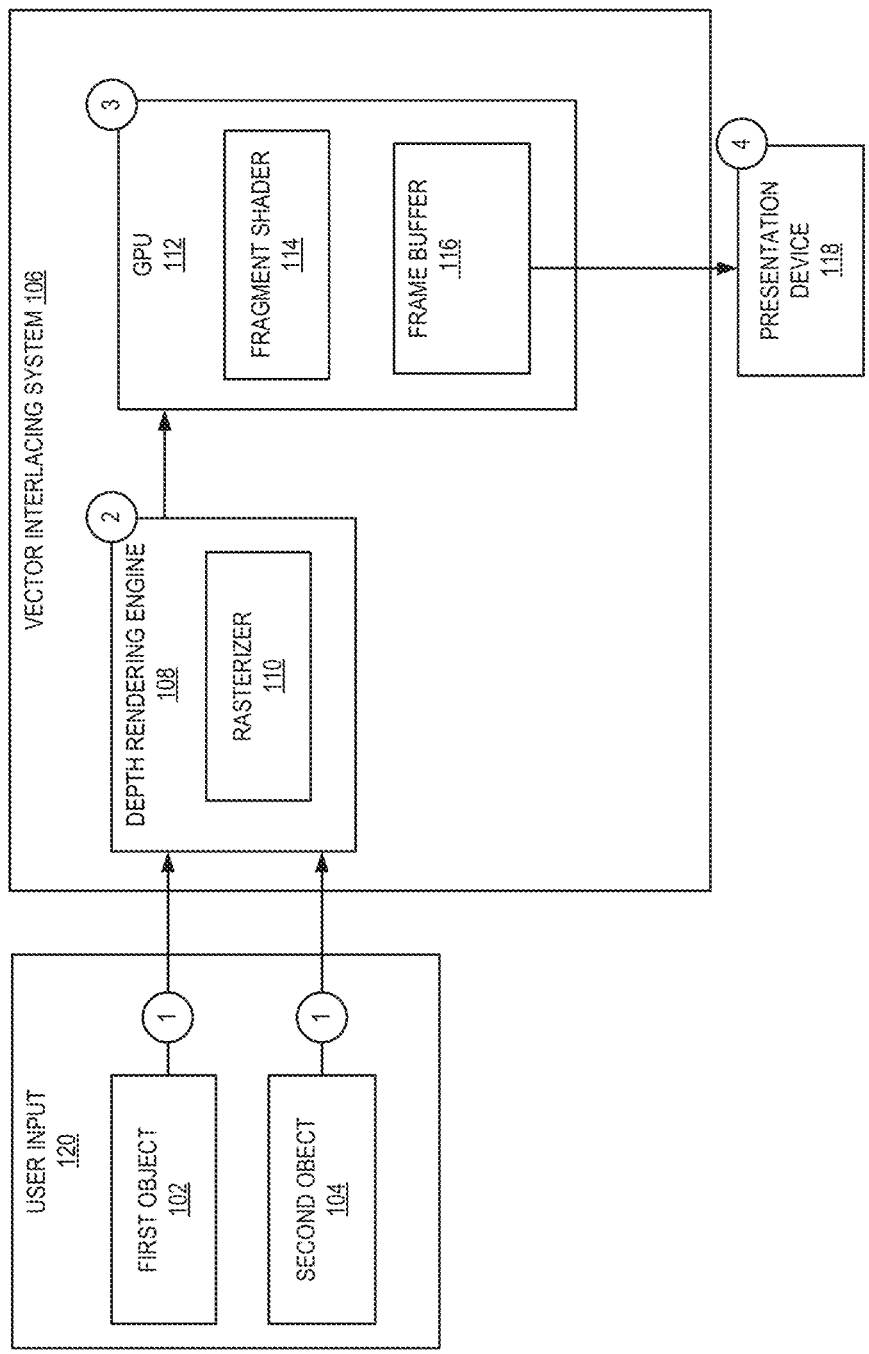
FIG. 1 illustrates a diagram of a process of vector interlacing in accordance with one or more embodiments.

One or more embodiments of the present disclosure includes a vector interlacing system that interlaces vector objects using a processor. The vector interlacing system generates drawing commands for the processor to write to a frame buffer. The processor performs interlacing by controlling the drawing commands and writing vector objects to one or more textures based on a depth position for each of the vector objects. Controlling the drawing commands includes applying a group of settings to a frame buffer and writing to one or more textures based on a depth position of the vector objects. By controlling the drawing commands, the vector interlacing system is able to preserve the original geometries of the vector objects while performing a visual interlacing on a presentation device.

Conventional techniques lack the ability to preserve the original geometry of the original shapes. As a result, conventional systems divide the original shapes into smaller shapes and compromises the original geometry. This results in an irreversible interlacing that cannot be flexible with reordering a depth of the objects.

To address these and other deficiencies in conventional systems, embodiments perform the interlacing of vector graphics by generating a set of drawing commands to one or more textures of a frame buffer of a processor. By including more than one texture in a drawing command, the vector interlacing system can track depth position of the objects being interlaced and draw objects that overlap based on the depth position. For example, the object that is "below" another object in an overlapping region will only be drawn at positions other than the overlapping region. This provides the ability to preserve geometries of the original objects for adjusting the depth positions, object scaling, and other manipulations that are degraded by splitting the geometry during interlacing.

Some of the techniques/technologies in accordance with the present disclosure relating to vector interlacing include providing a capability to change a depth ordering of any overlapping region while preserving original geometries of the vector objects. The vector interlacing of the present disclosure provides automatic mapping of geometry manipulations to the overlap regions to provide efficient re-ordering after manipulating one vector object. The vector interlacing of the present disclosure provides a robust solution that works with gradients without breaking a continuity of a gradient across regions which are in different depth order.

Embodiments generate a specific set of drawing commands for a graphics processor draws the objects in a depth order that alleviates the objects from being broken into smaller objects as required by conventional techniques. Instead, by performing the interlacing with a set of drawing commands, the original geometry of all objects is preserved providing a flexible capability to perform reordering of the objects in real-time by redrawing the objects based on a change in the depth position of the respective object. Additionally, retaining the original geometry allows vector interlacing to be performed while editing a size or scale of an object. The vector interlacing system efficiently performs the interlacing during the editing by adjusting the parameters of the drawing commands.

For example, a user may select objects that partially overlap. To interlace the objects, one of the objects is identified as a foreground object and the other object as a background object. The vector interlacing system analyzes the objects to determine a depth order (e.g., which object is above/below) for each pixel of the objects using the positions of the objects, any overlapping portions of the objects, and a selection from the user relating to intended object depth order. Based on the depth order, the two objects are interlacing by drawing the object with the lower depth position using the position information of the object with the upper depth position (e.g., a value stored in a stencil texture of a buffer). Object(s) having the lower depth position are then only drawn at locations that are not occupied by the object(s) with the upper depth position (e.g., using a stencil test). The vector interlacing system generates customized draw commands for a processor using multiple textures to interlace the layers using the frame buffer of the processor.

FIG. 1 illustrates a diagram of a process of vector interlacing in accordance with one or more embodiments. As depicted in FIG. 1, a computing environment 100 includes a vector interlacing system 106 includes a depth rendering engine 108, including a rasterizer 110, and a processor, such as graphics processing unit (GPU) 112, including fragment shader 114 and a frame buffer 116. In some embodiments, the vector interlacing system 106 is implemented as a module in a vector graphics processing application or another computing application.

At numeral 1, the vector interlacing system 106 obtains a first vector object 102 and a second vector object 104 as a user input 120. In an example, the first vector object 102 and second vector object 104 are different vector objects. The first vector object 102 and second vector object 104 are selected for interlacing by a user from a digital canvas that is presented in the user interface and includes multiple objects. The vector interlacing system is also configured to receive objects from other computing systems or software applications. The vector interlacing system 106 can assign an index to first vector object 102 or the second vector object 104 by determining a foreground or background object through various object detection, filtering, or search methods.

In some embodiments, the vector interlacing system 106 can select one or more regions of a vector object. For instance, a region denotes an area of a first vector object or a second vector object where a depth ordering of region is different than the depth position of the other portions of the second vector object or the first vector object. In one example, the vector interlacing system 106 can interlace a word that includes multiple letters. Each letter may have a local region for interlacing where the order of interlacing (e.g., based on the letter, spacing, etc.) may differ from the overall interlacing of the larger objects (e.g., letters generally in front of a design). The vector interlacing system 106 can obtain the region interactively by receiving a user input or providing free form region bounded by Bezier curves.

The vector interlacing system 106 is configurable to detect objects or regions in multiple modes. In a first mode, the vector interlacing system 106 detects the region or object using a free form region that is selected by the user or a pre-defined planar region that is generated based on a proximity to an interaction point (e.g., a click, a touch, a software defined location). In some embodiments, the vector interlacing system 106 has a second mode that identifies multiple pre-defined planar regions in a location near the interaction point. The vector interlacing system identifies one or more additional regions (e.g., an additional first vector object region or an additional second vector object region) within a proximity of the interaction point.

At numeral 2, the depth rendering engine 108 determines a depth position for the first vector object 102 and the second vector object 104. The depth rendering engine 108 detects that the first vector object 102 and the second vector object 104 have an overlap region that includes a portion of the first vector object 102 and a portion of the second vector object 104. For example, such an overlap occurs when the first vector object 102 is above/below the second vector object 104. The depth rendering engine 108 generates a customized drawing command that indicates one or more positions where the overlap region is present, and interlacing occurs. For example, the customized drawing command can be a processor command that includes a group of settings that define one or more frame buffer settings for the GPU. The group of settings include a texture setting that is used to control a write to one or more textures of the frame buffer, a texture test value, or another control value of the frame buffer. The rasterizer 110 converts a vector image to a raster image including a set of pixels, dots, or lines which can be presented via a display device. The customized drawing command adjusts the group of settings to control a depth position of each region considered, such as a group of multiple vector objects, a vector object such as the first vector object or the second vector object, or a sub-region of the vector object.

In some embodiments, the GPU splits rendering of artwork into three render passes. Each render pass shares the same frame buffer and is responsible for drawing three different components of vector image namely the first vector object, second vector object, and overlap region. Each render pass can be different depending on which color attachments are masked for drawing and the settings for depth, stencil test function, and frame buffer states.

At numeral 3, the GPU 112 receives the drawing command from the depth rendering engine 108 for writing to the frame buffer. The GPU 112 includes a fragment shader 114 and the frame buffer 116. The GPU 112 writes graphic data to the frame buffer 116 that includes multiple textures. The GPU 112 writes the first vector object 102 to a render texture and a depth texture based on the customized drawing command. The GPU 112 writes the overlap region to the render texture, the depth texture, and a stencil texture. The stencil texture is written based on the first vector object 102 being above the second vector object 104 based on the group of settings included in the customized drawing command. The GPU 112 writes the second vector object 104 to the render texture where the stencil texture does not have a previous value (e.g., where the first vector object is not above the second vector object) which is determined by a stencil test value in the group of settings of the customized drawing command. The GPU 112 applies the fragment shader 114 to the frame buffer to generate colors for the first vector object 102 and the second vector object 104. The output of the fragment shader is a depth value and color values to be written to the frame buffer 116.

At numeral 4, the GPU 112 communicates the frame buffer 116 to a presentation device 118. The presentation device 118 can be a monitor, a VR headset, a user device, or other visual display device. In some embodiments, after the frame buffer 116 is communicated to the presentation device, a user can select different depth positions for the first vector object 102 or the second vector object 104. The process will repeat numerals 2-4 to generate an updated frame buffer 116 that interlaces the first object 102 and the second vector object 104 in the different depth positions using a customized drawing command that indicates the different depth positions. The process will repeat when any edit to the first object 102, the second vector object 104, or a size of the digital canvas is received. Examples of edits include requesting a different depth order, moving, or applying a scaling factor to the first vector object 102 or the second vector object 104. The process will pause after all pixels of the digital canvas are rendered until a subsequent edit is received.

Figure 2:
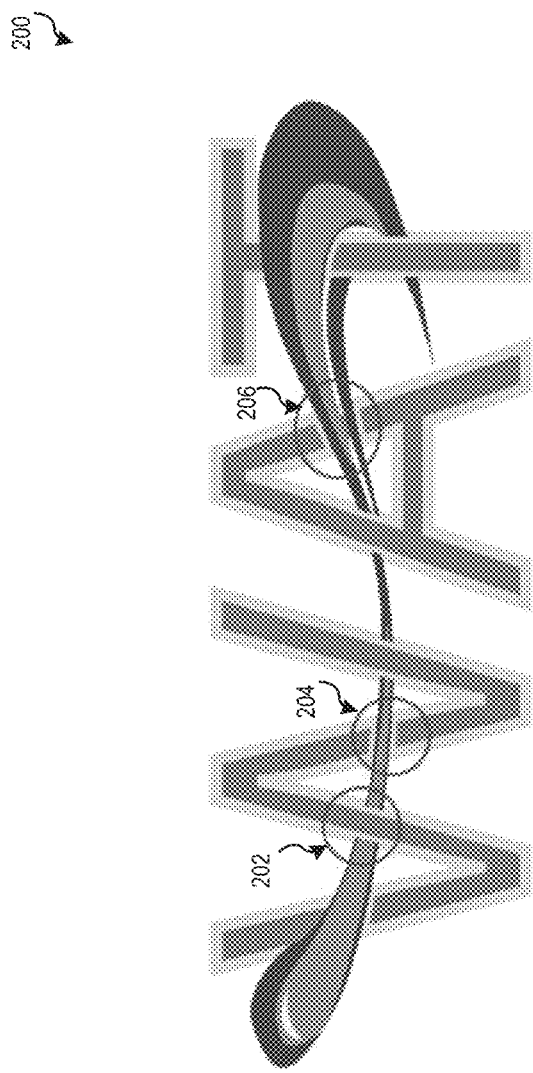
FIG. 2 illustrates an example of vector interlacing with geometry splitting.

In contrast with the embodiments of the present disclosure, FIG. 2 illustrates an example of vector interlacing using a typical geometry splitting approach. As depicted by FIG. 2, the vector interlacing of a vector image 200 includes a word vector object and a stroke vector object. The vector image 200 includes multiple overlap regions and some of the overlap regions include erroneous interlacing. For instance, the vector image 200 has a first overlap region 202, second overlap region 204, and third overlap region 206 that each include an interlacing error. As illustrated by FIG. 2, each of the first overlap region 202, the second overlap region 204, and the third overlap region 206 include an incorrect interlacing that results from the geometry splitting of the shapes of the word vector object and the stroke vector object. The incorrect interlacing has portions of the objects which are not properly above/below other objects because the shapes are split, and the original geometry is compromised. As an example, at first overlap region 202, because the word or letter vector object has multiple components (lighter shade and darker shade), the stroke vector object is interlaced halfway through the lighter shade because the geometry including both the lighter and darker shade is lost when the word vector object is split. In contrast, if properly interlaced, the stroke vector object would be entirely above or below the word vector object (e.g., below both the lighter and darker pattern-filled area) for the first overlap region 202. While FIG. 2 is described with regard to the first overlap region 202, second overlap region 204, and third overlap region 206, additional overlap regions and interlacing errors may be present.

Figure 3:
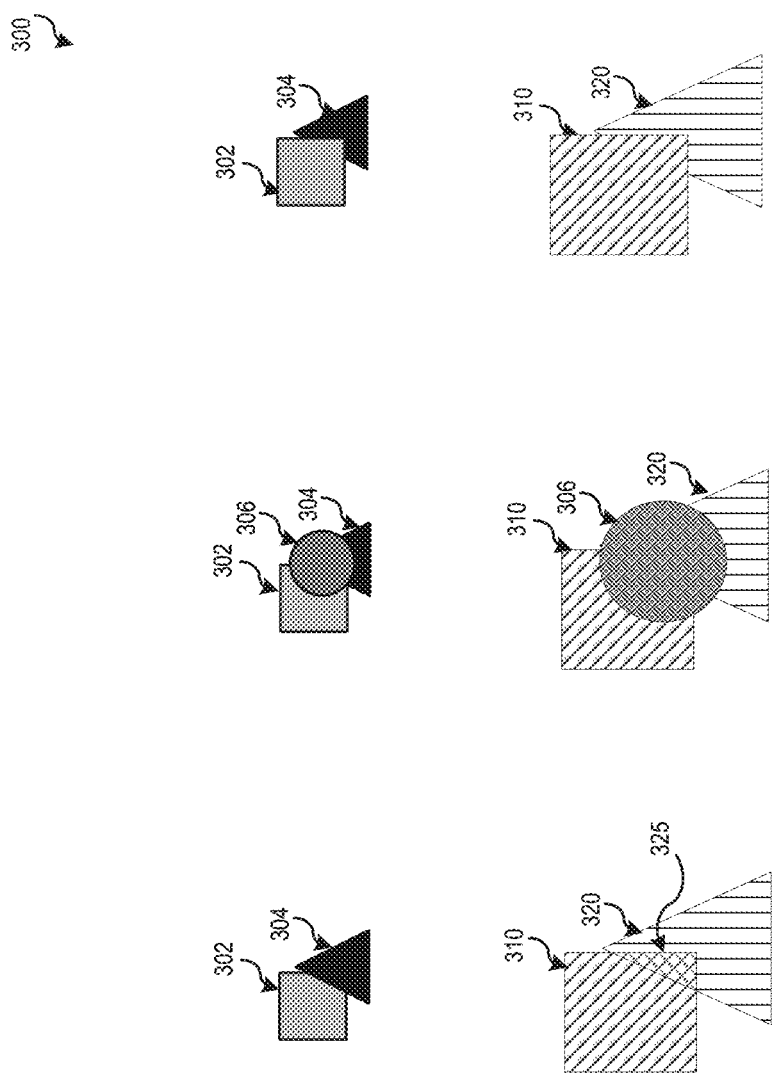
FIG. 3 illustrates an example of determining a partial depth order in accordance with one or more embodiments.

FIG. 3 illustrates an example of determining a partial depth order in accordance with one or more embodiments. The vector interlacing system receives a first vector object 302, a square, and a second vector object 304, a triangle. The first vector object 302 and the second vector object 304 can be obtained based on a user selection of the objects or a sequence of objects placed on a drawing area.

The depth rendering engine includes the rasterizer that converts a vector image to a raster image for display. The depth rendering engine can determine an overlap region 306 using the free form region selected by the user or a pre-defined planar region generated based on an interaction point such as a click location. The overlap region 306 is indicated by a circle, which is defined at least in part by a portion of the original geometries of the first vector object 302 and the second vector object 304. A visual example of the overlap is shown by the relationship between a first pattern-filled object 310 and a second pattern-filled object 320. The first pattern-filled object 310 and the second pattern-filled object 320 depict a pattern-filled version of the first vector object 302 and the second vector object 304, respectively.

As depicted by FIG. 3, the overlap region 306 encompasses a portion of the first vector object 302 and a portion of the second vector object 304. In this example, the overlap region 306 may be a pre-defined planar circle that is centered at a point received from a user interaction as described above but the overlap region 306 can include more or less area. This configuration ensures that the overlap region 306 includes a collocation region 325 where the objects occupy the same pixels and interlacing is needed. To perform the interlacing, the depth rendering engine generates a set of drawing commands to write the first vector object 302, the second vector object 304, and the overlap region 306 to one or more textures of a frame buffer of the GPU.

The depth rendering engine identifies a depth position for the first vector object 302 and the second vector object 304, such as based on a user selection of a depth order of the objects. After determining the depth orders, the depth rendering engine generates write commands for three textures of the frame buffer textures. In this example, the frame buffer includes a render texture, a depth texture, and a stencil texture. In some embodiments, the render texture stores the output content to be displayed. The depth texture is used to store coverage for the second vector object. The stencil texture is used to store the coverage of overlap region but only for pixels which include pixels of both the first vector object 302 and the second vector object 304.

A similar effect can be achieved by attaching extra textures as color attachments to the frame buffer, however, using the depth texture and stencil textures does not require any cross-dependencies across frames. This provides better performance and also avoids dependencies on texture barriers for one render pass to be able to read the output of previous render passes. The depth texture and stencil texture can store regions of interest, usable to generate additional regions of interest with a combination of depth and stencil tests during different render passes. In some embodiments, the beginning of drawing any frame is an initial condition that can set all values for one or more textures.

In the below examples, all vector regions can be rendered using porter-duff composition. Each vector object is assigned a depth value and the graphic rendering pipeline is modified to selectively write the vector objects to the render texture and/or the depth texture of the currently bound frame buffer of the GPU.

For example, the depth rendering engine assigns the first vector object 302 a first depth position and assigns the second vector object 304 a second depth position. In the example depicted by FIG. 3, the first vector object 302 is interlaced above the second vector object 304. The depth rendering engine writes the first vector object 302 to a render texture and a depth texture. The depth rendering engine identifies an overlap region 306 as described above. The depth rendering engine writes the overlap region 306 to a stencil texture to indicate that the first vector object 302 and the second vector object 304 should be interlaced at pixels where both objects have collocated pixels. In some embodiments, the depth rendering engine writes the overlap region with the stencil operation of replace and the stencil test setting of off. After writing the overlap region 306, the depth rendering engine writes the second vector object 304 to the frame buffer with the stencil test set to "not equal" to prevent the second vector object from being written to the frame buffer for pixels where values corresponding to the first vector object 302 are present in the depth texture. Additional details of specific write commands and GPU settings are described below.

Figure 4:
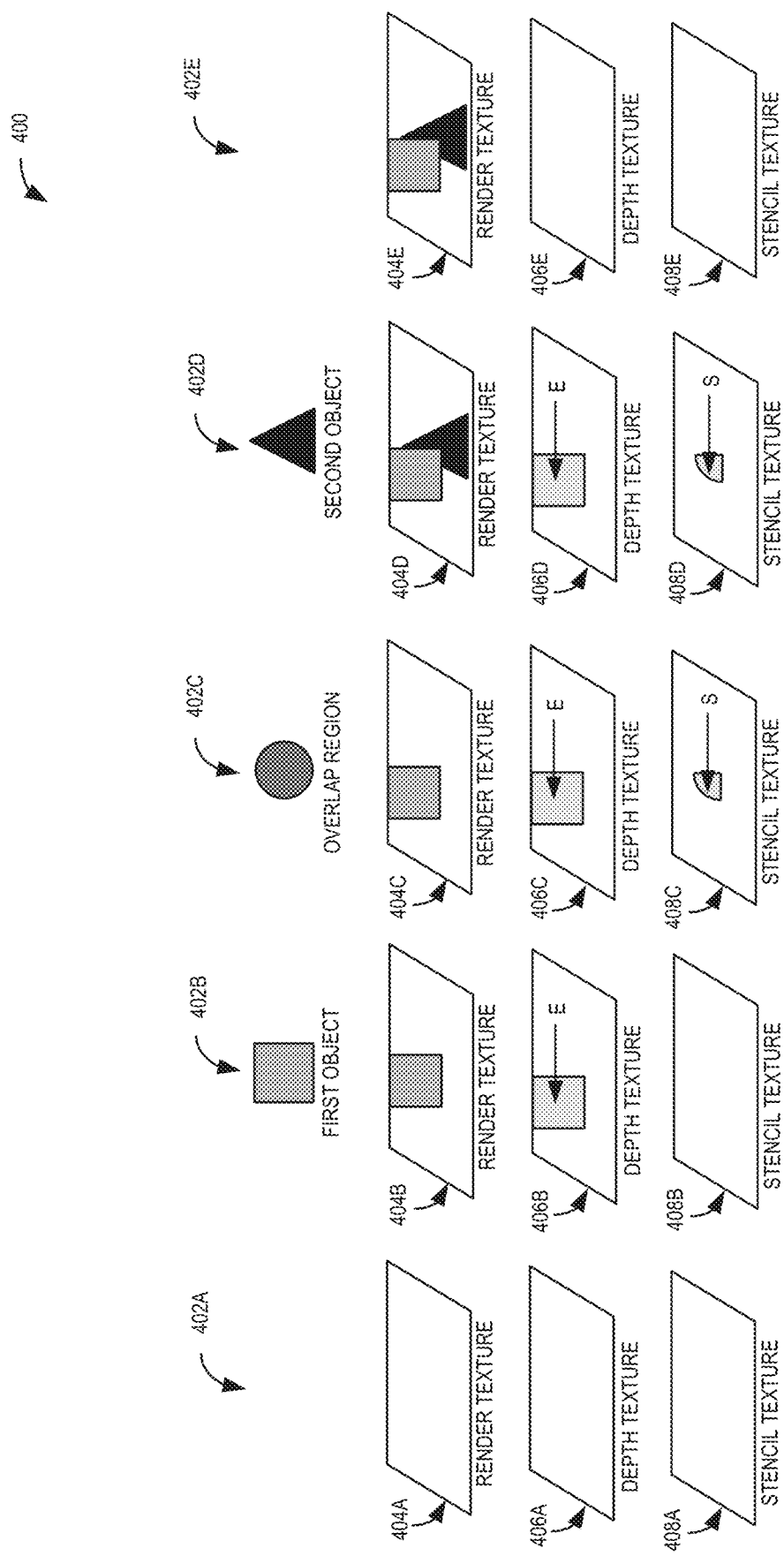
FIG. 4 depicts an example of a set of GPU drawing commands in accordance with some embodiments.

FIG. 4 depicts an example of a set of GPU drawing commands in accordance with some embodiments. The depth rendering engine issues a set of drawing commands to the GPU to write graphics information to a frame buffer for display to a user. In this example, frame buffer states 402A-402E are depicted, collectively referred to as "frame buffer states 402." Each of the frame buffer states 402 represents all of the pixels in a current image frame. The frame buffer has multiple textures for each frame buffer state. As illustrated in FIG. 4, each of the frame buffer states 402 include a render texture 404A-E, a depth texture 406A-E, and stencil texture 408A-E.

The frame buffer states 402 are each the result of a drawing command (post-rasterization) generated as described above. The frame buffer states 402 are determined based on a plurality of GPU settings including, but not limited to: color write, depth write, depth value, depth test, stencil write, stencil test, stencil operation, stencil reference, and the like.

At frame buffer state 402A, the values of the render texture 404A, the depth texture 406A, and the stencil texture 408A are cleared. Frame buffer state 402 can be an initial state prior to drawing graphical information of the first object or the second object.

At frame buffer state 402B, the GPU writes the first object to the frame buffer with graphic information in the render texture 404B and a value in the depth texture 406B that indicates that the first object is present at a particular position. The depth test is equal denoted by "E" and the stencil write is off.

At frame buffer state 402C, the GPU writes the overlap region to the frame buffer with no graphic information in the render texture 404C and the depth write is "off." The GPU writes to the stencil texture with a stencil operation of "replace" and writes a stencil reference value that indicates the first object is present at particular positions.

After the first vector object is rendered, the overlap region is rendered. The overlap region is added as an additional region where vector regions in the second vector object and vector regions in the first vector object overlap. The overlap region is rendered after the first vector object but before the second vector object. For the overlap region, all subregions are assigned same depth value as the first vector object and the depth test is set to 'Equal' such that the overlap region stores information only at pixels where the first has already been rendered. Further, since the overlap region is not part of the second vector object or first vector object, writes to render texture are disabled during the render pass (i.e., resulting in frame buffer state 402C) for the overlap region. The overlap region is rendered to stencil texture to retain separate information for coverage of the first vector object and overlap region. For example, a predefined stencil reference value, say a binary value 1, is set and written to stencil buffer with 'Replace' as the stencil operation.

At frame buffer state 402D, the GPU writes the second object to the frame buffer with graphic information in the render texture 404D and the depth write is off. The stencil write is "off" equal denoted by "S" and the test is set to "Not Equal." By specifying the stencil test in this way, the GPU writes the second object to the render texture 404D only at positions that do not have graphic information corresponding to the first object.

At frame buffer state 402E, the GPU retains the render texture 404E with both the first object and the second object and clears the depth texture 406E and the stencil texture 408E in preparation for the next graphical frame.

Figure 5:
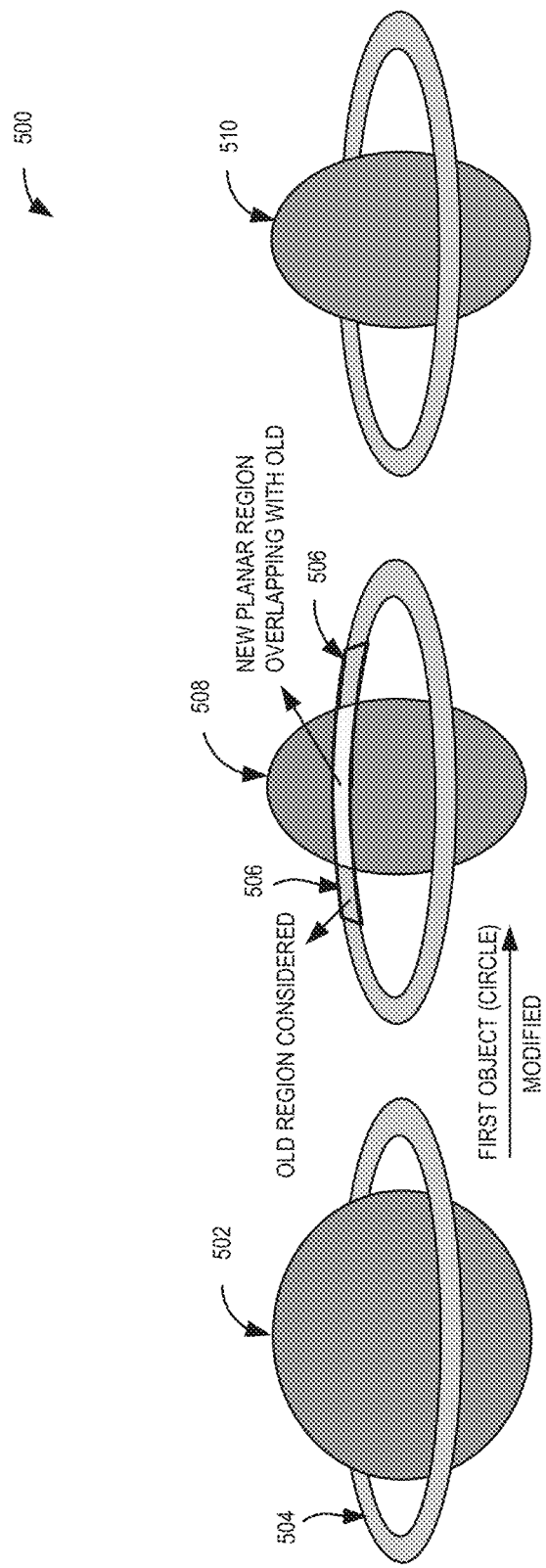
FIG. 5 illustrates an example of partial depth object manipulation of a first vector object in accordance with one or more embodiments.

FIG. 5 illustrates an example of partial depth object (environment) manipulation in accordance with one or more embodiments. In general, two different kinds of modifications are possible, either in the second vector object or in the first vector object. Overlap regions are an intersection of vector regions in the second vector object at the same location as vector regions in the first vector object. After modification of the second vector object or the first vector object, there will be a corresponding change in overlap region. In the example depicted by FIG. 5, the first vector object 502 is a circle and the second vector object 504 is a ring. In some embodiments, the vector interlacing system receives a request to modify the size and shape of the first vector object 502. For instance, the vector interlacing system receives an input from a user via a user interface. In this example, the first vector object 502 is manipulated to decrease a horizontal width and produce manipulated object 508. The vector interlacing system draws a portion of the second vector object 504 that no longer overlaps the first vector object 502 based on the manipulated object 508. In this example, the previous overlap region is compared with a new overlap region associated with the second vector object 504 and the manipulated object 508. The vector interlacing system can operate in the first mode, which has a freeform overlap region, or the second mode, which has a pre-defined planar region, to generate an adjustment region based on the new overlap region. An adjustment region 506 is identifiable by the vector interlacing system based on a difference between the first vector object 502 and the manipulated object 508. The adjustment region 506 represents a portion of the second vector object 504 that is no longer below the manipulated object 508 after the manipulation of the first vector object 502. As described above with regards to FIGS. 1-4, the vector interlacing system generates draw commands that indicate interlacing by using the stencil texture as a test to discard pixels of the second vector object that are below the first vector object from the frame buffer. The vector interlacing system generates the output image 510 that includes the manipulated first vector object 508 and the second vector object 504. As described previously, the vector interlacing system provides this real time interlacing because the original geometry of the second vector object 504 is preserved during the interlacing of the first vector object 502 and the second vector object 504.

Figure 6:
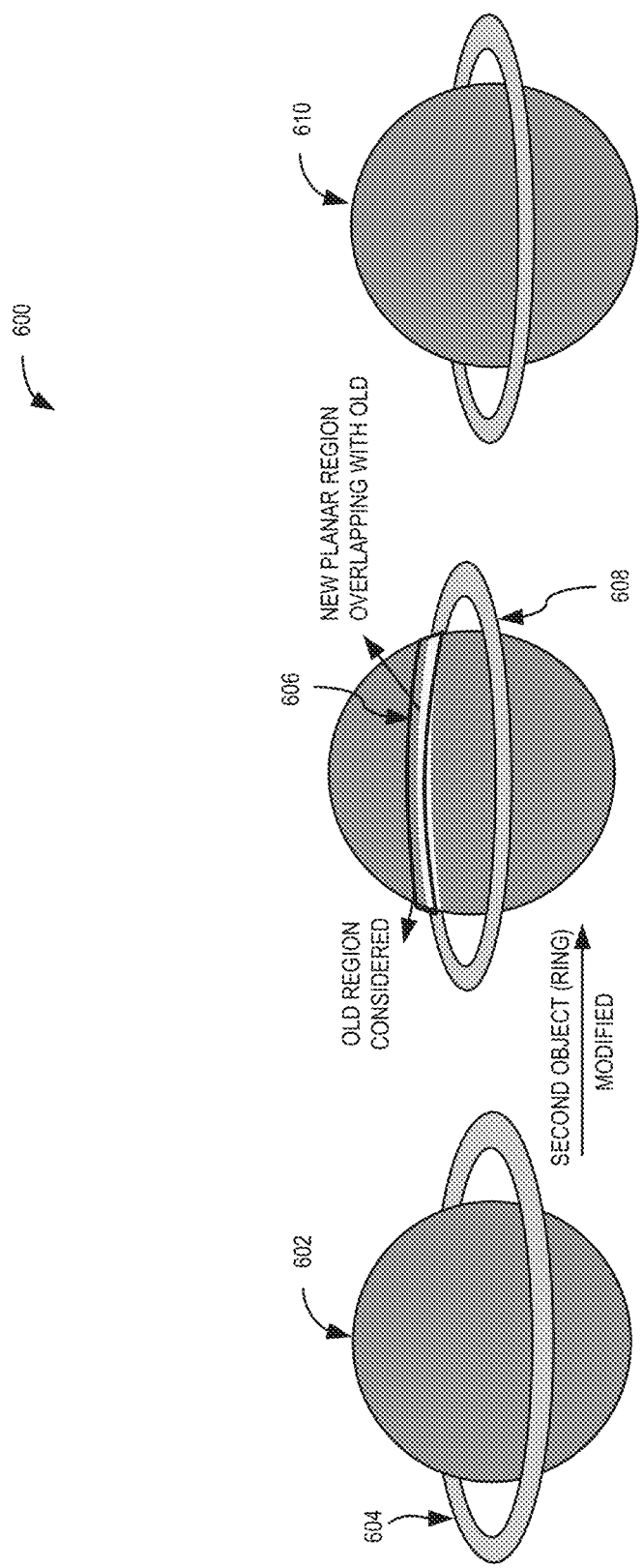
FIG. 6 illustrates an example of a partial depth object manipulation of a second vector object in accordance with one or more embodiments.

FIG. 6 illustrates an example of a partial depth object manipulation in accordance with one or more embodiments. In particular, FIG. 6 depicts a process of manipulating a second vector object 604 (i.e., the ring) instead of a first vector object 602 (i.e., the circle). In this example, the vector interlacing system receives a request to modify the second vector object 604. In this example, the requested modification to the second vector object 604 was to decrease a height from top to bottom of the second vector object. The requested modification can be visually identified between the shape of the ring (second vector object 604) on the left-most image and the shape of the ring (second vector object 604) in the center image. Similar to as described above with regard to FIG. 5, the vector interlacing system manipulates the second vector object 604 in response to the request, such as a user interaction. The vector interlacing system generates the manipulated object 608 and determines an adjustment region 606. The adjustment region 606 represents a portion of the manipulated object 608 that is below the first vector object 602. The process proceeds as described with regards to FIGS. 1-5 by interlacing the first vector object 602 and the manipulated object 608. The vector interlacing system generates the output image 610 after performing the interlacing. In some examples, some colocations exist between the overlap region and the new overlap region.

Figure 7:
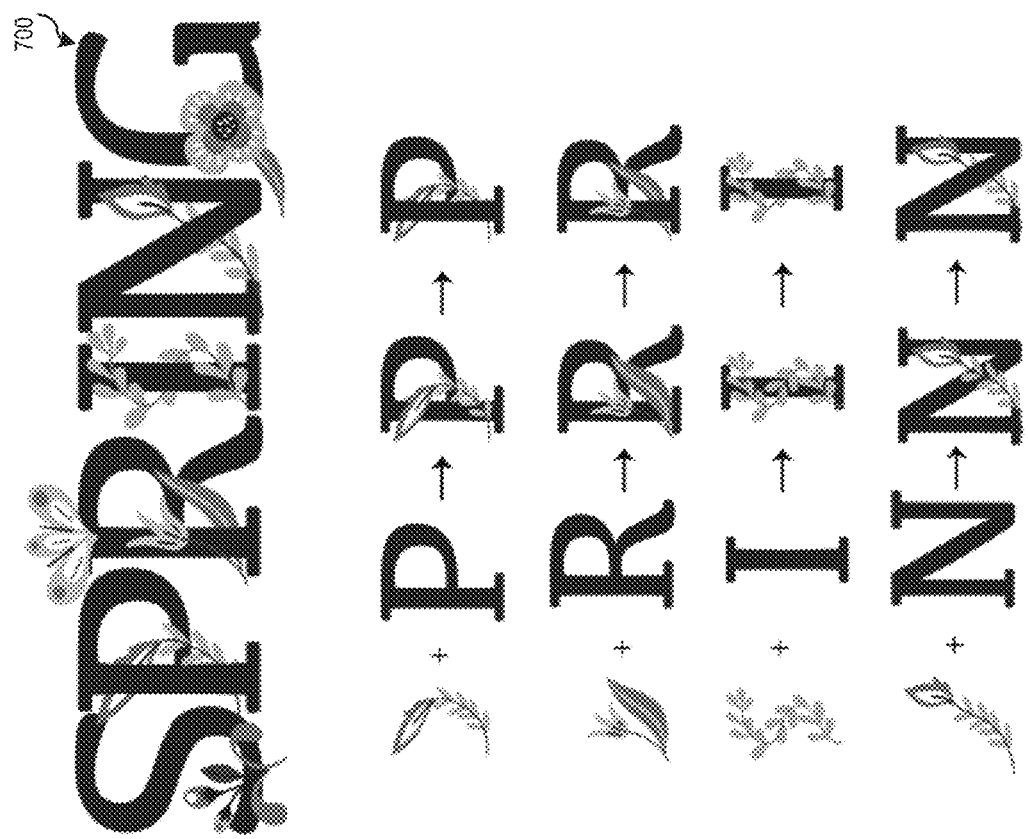
FIG. 7 illustrates examples of vector interlacing in accordance with one or more embodiments.

FIG. 7 illustrates examples of vector interlacing in accordance with one or more embodiments. As depicted in FIG. 7, outputs of interlacing various vector objects that define the word 700 are presented. The word 700 is a collection of interlaced vector objects such as a letter and a design pattern. Each letter of the word 700 can be interlaced as separate vector objects. The processes as described with regards to FIGS. 1-6 provide a capability to determine a depth position of each letter of the word 700. As described above, each letter of the word 700 can have a different depth positioning selected by the user or determined by the vector interlacing system. For example, a floral pattern 702 and a letter 704 are being interlaced. As described above, the vector interlacing system preserves the geometry of the floral pattern 702 and letter 704 during interlacing. The vector interlacing system produces a first interlacing 706 or a second interlacing 708. The vector interlacing system interlaces the floral pattern 702 above the letter 704 to produce the first interlacing 706. By re-ordering the floral pattern 702 below the letter 706, the vector interlacing system produces the second interlacing 708.

Figure 8:
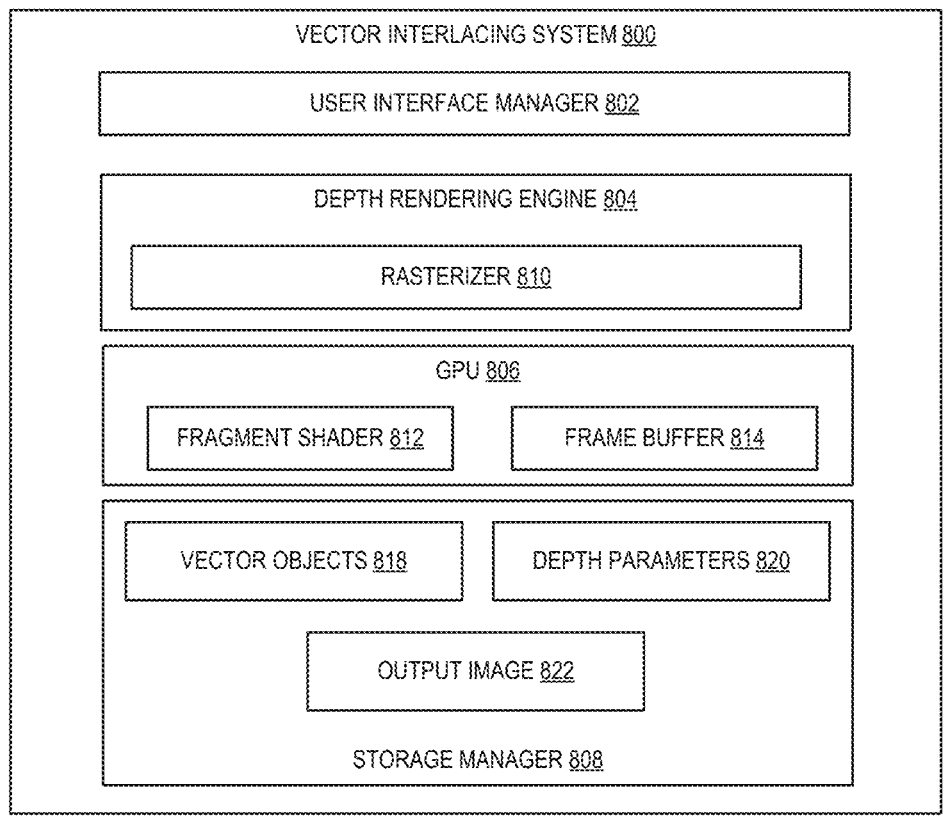
FIG. 8 illustrates a schematic diagram of a vector interlacing system in accordance with one or more embodiments.

FIG. 8 illustrates a schematic diagram of a vector interlacing system in accordance with one or more embodiments. As shown, vector interlacing system 800 may include, but is not limited to, a user interface manager 802, a depth rendering engine 804, a GPU 806, and a storage manager 808. The depth rendering engine 804 includes a rasterizer 810. The GPU 806 includes a fragment shader 812 and a frame buffer 814. The storage manager 808 includes vector objects 818, depth parameters 820, and output image 822.

As illustrated in FIG. 8, the vector interlacing system 800 includes a user interface manager 802. For example, the user interface manager 802 allows users to input vector objects, select a depth order of the vector objects to the vector interlacing system 800. In some embodiments, the user interface manager 802 provides a user interface through which the user interacts with the vector objects such as selecting a depth order (e.g., re-ordering the depth position), manipulating a vector object, view the output image, or any combination thereof. Alternatively, or additionally, the user interface may enable the user to select a vector object for import, either by providing an address (e.g., a URL or other endpoint) associated with the remote file or connecting to a remote storage (e.g., cloud storage) that includes the vector object.

As shown in FIG. 8, the vector interlacing system 800 includes a depth rendering engine 804. The depth rendering engine 804 detects a first vector object and a second vector object that have an overlap region. The depth rendering engine 804 determines that a portion of the first vector object is above/below the second vector object. The depth rendering engine 804 generates a customized drawing command that indicates one or more positions where the interlacing occurs. The depth rendering engine 804 determines a first depth position for the first vector object and a second depth position for the second vector object. The depth rendering engine 804 customizes the draw commands based on the first depth position and the second depth position. The depth rendering engine 804 includes rasterizer 810 that converts a vector image to a raster image for display.

As shown in FIG. 8, the vector interlacing system 800 further includes a GPU 806. The GPU 806 includes a fragment shader 812 and a frame buffer 814. The GPU 806 is an electronic circuit to render graphics for display on the presentation device. The GPU 806 can be highly parallel for efficient rendering of the vector objects. The GPU 806 applies the fragment shader to generate colors for the first vector object and the second vector object. The output of the fragment shader is a depth value and color values to be written to the frame buffer 814.

As shown in FIG. 8, the vector interlacing system 800 further includes a frame buffer 814. The frame buffer 814 is a memory structure that contains electronic data that represents all of the pixels in an image. The frame buffer 814 is sized to the maximum size of an image that is presentable of the display. The frame buffer 814 represents all of the pixels in an image frame. The GPU 806 communicates with the frame buffer 814 to a presentation device.

As shown in FIG. 8, the vector interlacing system 800 further includes a storage manager 808. The storage manager 808, as shown in FIG. 8, includes the vector objects 818. The vector objects 818 includes a one or more vector objects that are usable for vector interlacing. For example, the vector objects can include a library of selectable objects that can be added to an image for interlacing. Examples of the vector objects include the letters and designs of the word or letters described with respect to FIG. 7.

As further illustrated in FIG. 8, the storage manager 808 also includes depth parameters 820. The depth parameters 820 are a group of settings including, but not limited to: GPU settings, texture settings, or other drawing settings which correspond to a particular depth position. For example, the depth parameters 820 associated with a first vector object may be different than the depth parameters 820 associated with a second vector object. In some examples, the depth parameters 820 may be indexed based on any number of depth positions that is configurable to accommodate any number of vector objects or groups of vector objects.

As further illustrated in FIG. 8, the storage manager 808 may also include an output image 822. The output image 822 represents the output of the vector interlacing system 800 that may be stored or presented by a display device to the user during operation of the vector interlacing system 800.

Each of the components 802-808 of the vector interlacing system 800 and their corresponding elements (as shown in FIG. 8) may be in communication with one another using any suitable communication technologies. It will be recognized that although components 802-808 and their corresponding elements are shown to be separate in FIG. 8, any of components 802-808 and their corresponding elements may be combined into fewer components, such as into a single facility or module, divided into more components, or configured into different components that may serve a particular embodiment.

The components 802-808 and their corresponding elements can comprise software, hardware, or both. For example, the components 802-808 and their corresponding elements comprise one or more instructions stored on a computer-readable storage medium and executable by processors of one or more computing devices. When executed by the one or more processors, the computer-executable instructions of the vector interlacing system 800 cause a client device and/or a server device to perform the methods described herein. Alternatively, the components 802-808 and their corresponding elements can comprise hardware, such as a special purpose processing device to perform a certain function or group of functions. Additionally, the components 802-808 and their corresponding elements can comprise a combination of computer-executable instructions and hardware.

Furthermore, the components 802-808 of the vector interlacing system 800 may, for example, be implemented as one or more stand-alone applications, as one or more modules of an application, as one or more plug-ins, as one or more library functions or functions that may be called by other applications, and/or as a cloud-computing model. Thus, the components 802-808 of vector interlacing system 800 may be implemented as a stand-alone application, such as a desktop or mobile application. Furthermore, the components 802-808 of the vector interlacing system 800 may be implemented as one or more web-based applications hosted on a remote server. Alternatively, or additionally, the components of the vector interlacing system 800 may be implemented in a suit of mobile device applications or "apps."

Figure 9:
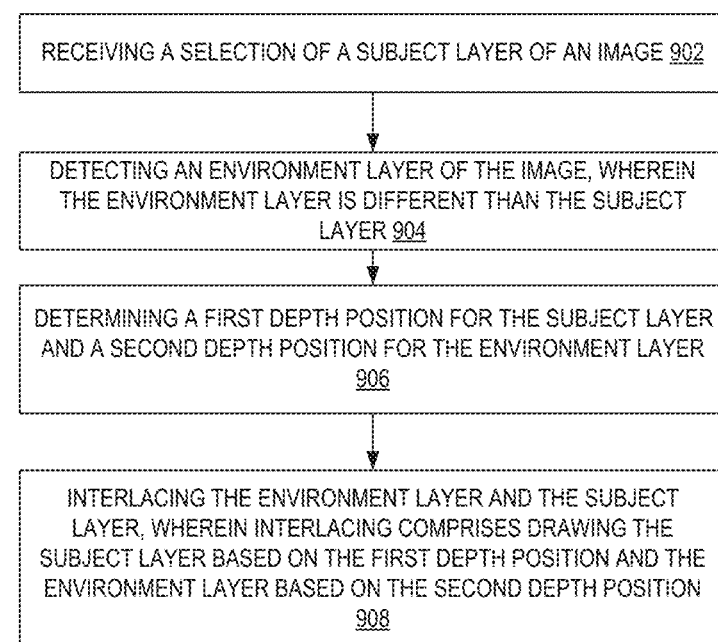
FIG. 9 illustrates a flowchart of a series of acts in a method of vector interlacing in accordance with one or more embodiments.

FIGS. 1-8, the corresponding text, and the examples, provide a number of different systems and devices that perform vector interlacing. In addition to the foregoing, embodiments also are described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of vector interlacing in accordance with one or more embodiments. In one or more embodiments, the method 900 is performed in a digital medium environment that includes the vector interlacing system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a selection of a first vector object of an image. As described above, the selection of the first vector object can be received by a user interface, an interaction point, or other processes. The first vector object can be obtained based on a user selection of an object placed in a drawing area, such as a digital canvas provided by a user interface.

As illustrated in FIG. 9, the method 900 includes an act 904 of detecting a second vector object of the image, wherein the second vector object is different than the first vector object. The vector interlacing system determines a second vector object of the image based on a freeform region or a pre-defined planar region that include at least a portion of the first vector object and at least a portion of another object that include one or more-pixel locations in common.

As illustrated by FIG. 9, the method 900 includes an act 906 of determining a first depth position for the first vector object and a second depth position for the second vector object. The vector interlacing system determines a depth position based on an overlap region between the first vector object and the second vector object. The overlap region is a planar region based on an initial position selected by the user and includes one or more regions where the first vector object and the second vector object have overlapping locations and interlacing of the pixels is to be performed. The vector interlacing system assigns a depth position for the first vector object and the second vector object that indicates a depth order for writing to the frame buffer. In some embodiments, determining a first depth position for the first vector object and a second depth position for the second vector object includes preserving pixel and shape data for both the first vector object and the second vector object by utilizing a customized drawing command rather than splitting the original geometries of the first vector object or the second vector object. In some embodiments, determining a first depth position for the first vector object and a second depth position for the second vector object includes determining one or more regions of the image that correspond to the first vector object, wherein the one or more regions are within a threshold distance from the selection; and determining an additional region of the image that does not correspond with the first vector object, wherein the additional region is added to the second vector object.

As illustrated by FIG. 9, the method 900 includes an act 908 of interlacing the second vector object and the first vector object includes drawing the first vector object based on the first depth position and the second vector object based on the second depth position. The vector interlacing system generates a customized drawing command and a group of settings that indicate multiple frame buffer settings. The customized drawing command includes a group of settings defining various texture settings that are used to control a write to one or more textures of the frame buffer, a texture test value, or another control value of the frame buffer. The rasterizer 110 converts a vector image to a raster image including a set of pixels, dots, or lines which can be presented via a display device. The customized drawing command adjusts the group of settings to control a depth position of each region considered, such as a group of multiple vector objects, a vector object such as the first vector object or the second vector object, or a sub-region of the vector object.

In some embodiments, the GPU splits rendering of artwork into three render passes. Each render pass shares the same frame buffer and is responsible for drawing three different components of vector image namely the first vector object, second vector object, and overlap region. Each render pass can be different depending on which color attachments are masked for drawing and the settings for depth, stencil test function, and frame buffer states.

In some embodiments, drawing the first vector object based on the first depth position and the second vector object based on the second depth position includes generating a frame buffer comprising a render texture, a depth texture, and a stencil texture; writing the second vector object to the render texture and the depth texture; writing a stencil reference value associated with the second vector object to the stencil texture; discarding one or more pixels of the first vector object, wherein the one or more pixels of the first vector object have a location that corresponds to a pixel that has a stencil reference value associated with the second vector object; and writing the first vector object to the render texture.

In some embodiments, drawing the first vector object based on the first depth position and the second vector object based on the second depth position includes generating a frame buffer comprising a render texture, a depth texture, and a stencil texture; writing the first vector object to the render texture and the depth texture; writing a stencil reference value associated with the first vector object to the stencil texture; discarding one or more pixels of the second vector object, wherein the one or more pixels of the second vector object have a location that corresponds to a pixel that has a stencil reference value associated with the first vector object; and writing the second vector object to the render texture.

In some embodiments the method 900 further includes acts of receiving, after drawing, a request to modify the second vector object or first vector object; mapping a third depth position for the first vector object and a fourth depth position for the second vector object, wherein the mapping is based on the request; and drawing the first vector object based on the third depth position and the second vector object based on the fourth depth position.

Figure 10:
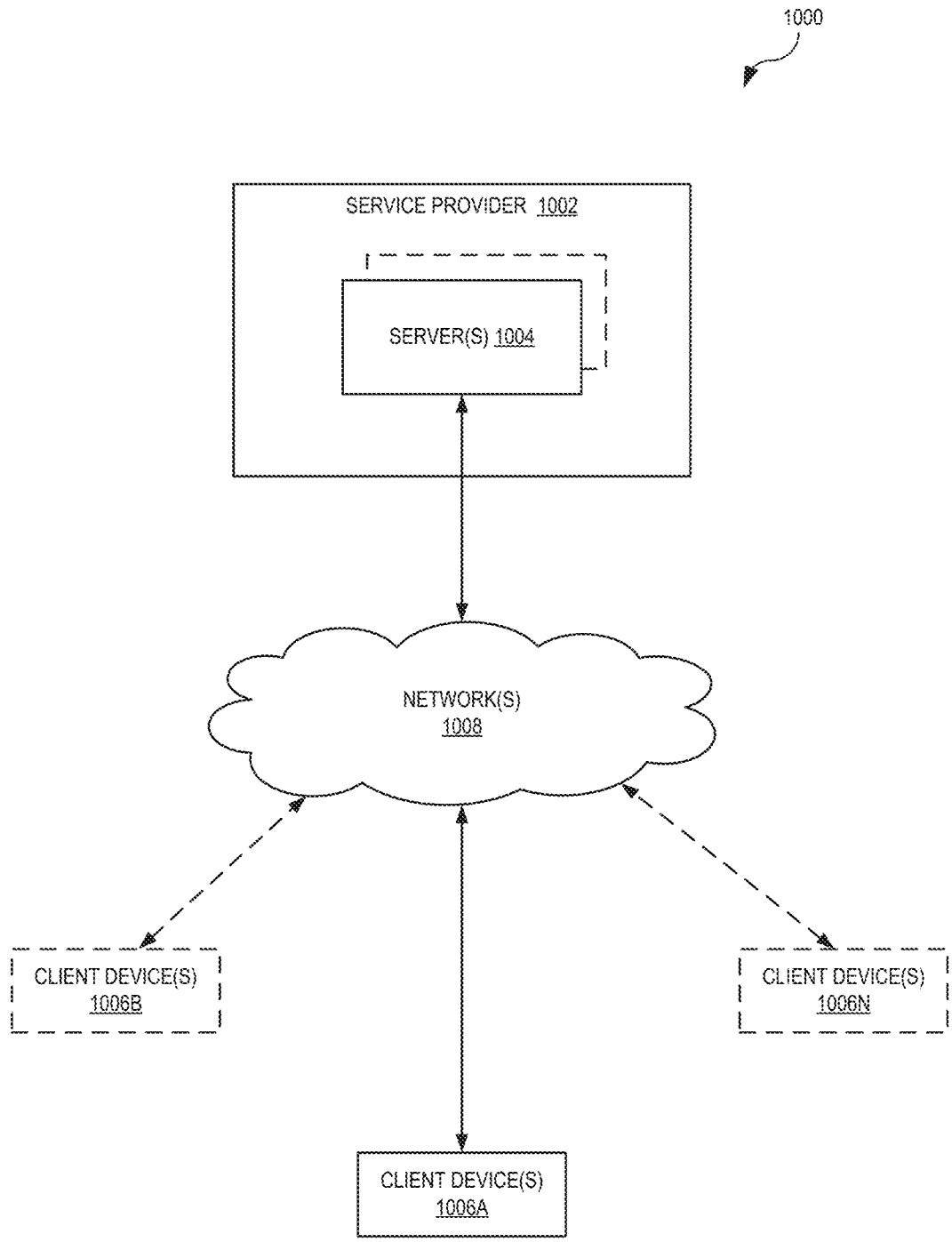
FIG. 10 illustrates a schematic diagram of an exemplary environment in which the vector interlacing system can operate in accordance with one or more embodiments.

FIG. 10 illustrates a schematic diagram of an exemplary environment 1000 in which the vector interlacing system 800 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the vector interlacing system 800. In particular, the vector interlacing system 800 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or fewer than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including vector objects 818, depth parameters 820, output image 822, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the vector interlacing system 800. In particular, the vector interlacing system 800 can comprise an application running on the one or more servers 1004 or a portion of the vector interlacing system 800 can be downloaded from the one or more servers 1004. For example, the vector interlacing system 800 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide access to one or more electronic documents 1020 stored at the one or more servers 1004. Moreover, the client device 1006A can receive a request (i.e., via user input) to draw with a drawing tool on a canvas material and provide the request to the one or more servers 1004. Upon receiving the request, the one or more servers 1004 can automatically perform the methods and processes described above to generate output audio representative of the drawing tool, canvas material, and real-time raw drawing parameters. The one or more servers 1004 can provide all or output image 822, to the client device 1006A for presentation to the user.

As just described, the vector interlacing system 800 may be implemented in whole, or in part, by the individual elements 1002-1008 of the environment 1000. It will be appreciated that although certain components of the vector interlacing system 800 are described in the previous examples with regard to particular elements of the environment 1000, various alternative implementations are possible. For instance, in one or more embodiments, the vector interlacing system 800 is implemented on any of the client devices 1006A-N. Similarly, in one or more embodiments, the vector interlacing system 800 may be implemented on the one or more servers 1004. Moreover, different components and functions of the vector interlacing system 800 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
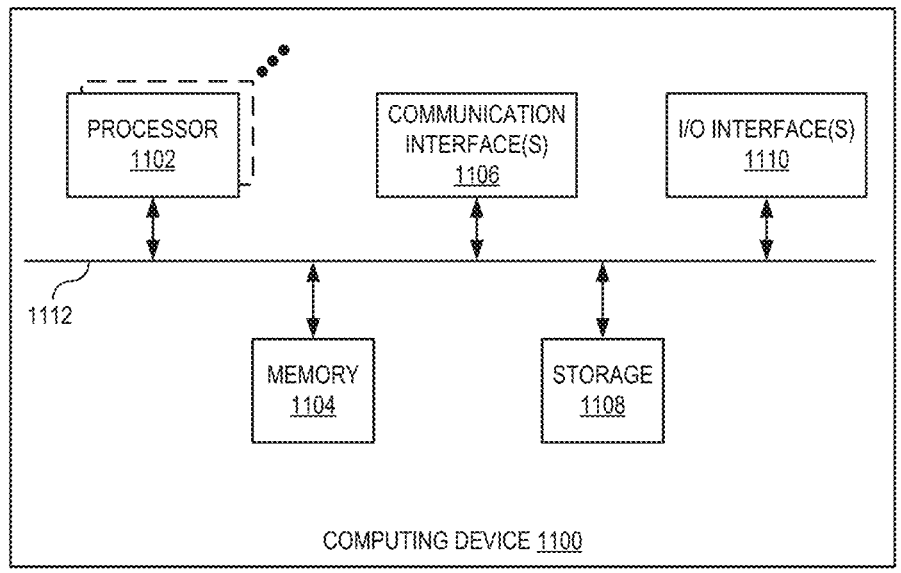
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the electronic drawing system. As shown by FIG. 11, the computing device 1100 can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 which includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination of these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving, by a processor of a computer system, a selection of a first vector object of an image, wherein the first vector object comprises a first plurality of pixels;
   detecting, by the processor of the computer system, a second vector object of the image, wherein the second vector object comprises a second plurality of pixels, and wherein the second plurality of pixels is different than the first plurality of pixels;
   determining, by the processor of the computer system, a first depth position for the first vector object and a second depth position for the second vector object, wherein the first depth position represents a depth position that is above the second depth position; and
   interlacing, by the processor of the computer system, the second vector object and the first vector object, wherein interlacing comprises:

drawing each pixel of the first vector object based on the first depth position, and drawing each pixel of the second vector object based on the second depth position, wherein each pixel of the second vector object is drawn at a location that is not occupied by pixels of the first vector object.

2. The method of claim 1, wherein drawing the first vector object and the second vector object based on the depth position comprises:

generating a frame buffer comprising a render texture, a depth texture, and a stencil texture;

writing the second vector object to the render texture and the depth texture;

writing a stencil reference value associated with the second vector object to the stencil texture;

discarding one or more pixels of the first vector object, wherein the one or more pixels of the first vector object have a location that corresponds to a pixel that has a stencil reference value associated with the second vector object; and writing the first vector object to the render texture.

3. The method of claim 1, wherein drawing the first vector object and the second vector object based on the depth position comprises:

generating a frame buffer comprising a render texture, a depth texture, and a stencil texture;

writing the first vector object to the render texture and the depth texture;

writing a stencil reference value associated with the first vector object to the stencil texture;

discarding one or more pixels of the second vector object, wherein the one or more pixels of the second vector object have a location that corresponds to a pixel that has a stencil reference value associated with the first vector object; and writing the second vector object to the render texture.

4. The method of claim 1 further comprising:

receiving, after drawing, a request to modify the second vector object or the first vector object;

mapping a third depth position for the first vector object and a fourth depth position for the second vector object, wherein the mapping is based on the request; and drawing the first vector object based on the third depth position and the second vector object based on the fourth depth position.

5. The method of claim 1, wherein determining a first depth position for the first vector object and a second depth position for the second vector object comprises preserving pixel and shape data for both the first vector object and the second vector object.

6. The method of claim 1, wherein detecting a second vector object of the image comprises:

determining one or more regions of the image that correspond to the first vector object, wherein the one or more regions are within a threshold distance from the selection; and determining an additional region of the image that does not correspond with the first vector object, wherein the additional region is added to the second vector object.

7. The method of claim 6, wherein interlacing the second vector object and the first vector object comprises drawing the one or more regions of the image that correspond to the first vector object with the additional region of the image that does not correspond with the first vector object.

8. The method of claim 1, wherein the processor is a graphics processing unit (GPU).

9. A non-transitory computer-readable storage medium including instructions stored thereon which, when executed by at least one processor, cause the at least one processor to perform operations comprising:

receiving a selection of a first vector object of an image, wherein the first vector object comprises a first plurality of pixels;

detecting a second vector object of the image, wherein the second vector object comprises a second plurality of pixels, and wherein the second plurality of pixels is different than the first plurality of pixels;

determining a first depth position for the first vector object and a second depth position for the second vector object, wherein the first depth position represents a depth position that is above the second depth position; and interlacing the second vector object and the first vector object, wherein interlacing comprises:

drawing each pixel of the first vector object based on the first depth position, and drawing each pixel of the second vector object based on the second depth position, wherein each pixel of the second vector object is drawn at a location that is not occupied by pixels of the first vector object.

10. The non-transitory computer-readable storage medium of claim 9, wherein the operation of drawing the first vector object and the second vector object based on the depth position comprises instructions which, when executed by at least one processor, cause the at least one processor to perform operations comprising:

generating a frame buffer comprising a render texture, a depth texture, and a stencil texture;

writing the second vector object to the render texture and the depth texture;

writing a stencil reference value associated with the second vector object to the stencil texture;

discarding one or more pixels of the first vector object, wherein the one or more pixels of the first vector object have a location that corresponds to a pixel that has a stencil reference value associated with the second vector object; and writing the first vector object to the render texture.

11. The non-transitory computer-readable storage medium of claim 9, wherein the operation of drawing the first vector object and the second vector object based on the depth position comprises instructions which, when executed by at least one processor, cause the at least one processor to perform operations comprising:

generating a frame buffer comprising a render texture, a depth texture, and a stencil texture;

writing the first vector object to the render texture and the depth texture;

writing a stencil reference value associated with the first vector object to the stencil texture;

discarding one or more pixels of the second vector object, wherein the one or more pixels of the second vector object have a location that corresponds to a pixel that has a stencil reference value associated with the first vector object; and writing the second vector object to the render texture.

12. The non-transitory computer-readable storage medium of claim 9, further comprising instructions which, when executed by at least one processor, cause the at least one processor to perform operations comprising:

receiving, after drawing, a request to modify the second vector object or the first vector object;

mapping a third depth position for the first vector object and a fourth depth position for the second vector object, wherein the mapping is based on the request; and drawing the first vector object based on the third depth position and the second vector object based on the fourth depth position.

13. The non-transitory computer-readable storage medium of claim 9, wherein the operation of determining a first depth position for the first vector object and a second depth position for the second vector object comprises instructions which, when executed by at least one processor, cause the at least one processor to perform operations comprising preserving pixel and shape data for both the first vector object and the second vector object.

14. The non-transitory computer-readable storage medium of claim 9, wherein the operation of detecting a second vector object of the image comprises instructions which, when executed by at least one processor, cause the at least one processor to perform operations comprising:

determining one or more regions of the image that correspond to the first vector object, wherein the one or more regions are within a threshold distance from the selection; and determining an additional region of the image that does not correspond with the first vector object, wherein the additional region is added to the second vector object.

15. The non-transitory computer-readable storage medium of claim 14, wherein the operation of interlacing the second vector object and the first vector object comprises instructions, which, when executed by at least one processor, cause the processor to draw the one or more regions of the image that correspond to the first vector object with the additional region of the image that does not correspond with the first vector object.

16. A system comprising:

a memory component; and a processing device coupled to the memory component, the processing device to perform operations comprising:

receiving a selection of a first region of a first vector object of an image, wherein the first vector object comprises a first plurality of pixels;

detecting a second region of a second vector object of the image, wherein the second vector object comprises a second plurality of pixels, and wherein the second plurality of pixels is different than the first plurality of pixels;

identifying an additional region within a threshold distance of the first region;

determining a first depth position for the first region and a second depth position for the second region, wherein the first depth position represents a depth position that is above the second depth position;

assigning the additional region the first depth position; and interlacing the second region, the first region, and the additional region, wherein interlacing comprises:

drawing each pixel of the first region and the additional region based on the first depth position, and drawing each pixel of the second region based on the second depth position, wherein each pixel of the second vector object is drawn at a location that is not occupied by pixels of the first vector object.

17. The system of claim 16, wherein the operation of drawing the first region and the second region based on the depth position further comprises instructions that further cause the processing device to perform operations comprising:

generating a frame buffer comprising a render texture, a depth texture, and a stencil texture;

writing the second region to the render texture and the depth texture;

writing a stencil reference value associated with the second region to the stencil texture;

discarding one or more pixels of the first region, wherein the one or more pixels of the first region have a location that corresponds to a pixel that has a stencil reference value associated with the second region; and writing the first region to the render texture.

18. The system of claim 16, wherein the operation of drawing the first region and the second region based on the depth position further comprises instructions that further cause the processing device to perform operations comprising:

generating a frame buffer comprising a render texture, a depth texture, and a stencil texture;

writing the first region to the render texture and the depth texture;

writing a stencil reference value associated with the first region to the stencil texture;

discarding one or more pixels of the second region, wherein the one or more pixels of the second region have a location that corresponds to a pixel that has a stencil reference value associated with the first region; and writing the second region to the render texture.

19. The system of claim 16, the operations further comprising:

receiving, after drawing, a request to modify the second region or first region;

mapping a third depth position for the first region and a fourth depth position for the second region, wherein the mapping is based on the request; and drawing the first region based on the third depth position and the second region based on the fourth depth position.

20. The system of claim 16, wherein the operation of determining a first depth position for the first region and a second depth position for the second region further comprises instructions that further cause the processing device to perform operations comprising preserving pixel and shape data for both the first region and the second region.

* * * * *